(12) United States Patent
Roth et al.

(10) Patent No.: US 9,179,169 B2
(45) Date of Patent: Nov. 3, 2015

(54) ADAPTIVE MEDIA DELIVERY

(75) Inventors: Todd Stuart Roth, Shadow Hills, CA (US); Stanley Robert Moote, Toronto (CA)

(73) Assignee: Imagine Communications Corp., Frisco, TX (US)

( * ) Notice: Subject to any disclaimer, the term of this patent is extended or adjusted under 35 U.S.C. 154(b) by 223 days.

(21) Appl. No.: 13/419,887

(22) Filed: Mar. 14, 2012

(65) Prior Publication Data

US 2013/0242185 A1    Sep. 19, 2013

(51) Int. Cl.

| | |
|---|---|
| H04L 29/06 | (2006.01) |
| H04L 29/08 | (2006.01) |
| H04N 21/2343 | (2011.01) |
| H04N 21/239 | (2011.01) |
| H04N 21/262 | (2011.01) |
| H04N 21/6379 | (2011.01) |
| H04N 21/845 | (2011.01) |
| H04L 12/801 | (2013.01) |
| H04L 12/26 | (2006.01) |

(52) U.S. Cl.
CPC ....... *H04N 21/2343* (2013.01); *H04N 21/2393* (2013.01); *H04N 21/26208* (2013.01); *H04N 21/6379* (2013.01); *H04N 21/8456* (2013.01); *H04L 29/06* (2013.01); *H04L 29/06027* (2013.01); *H04L 43/0888* (2013.01); *H04L 47/10* (2013.01); *H04L 69/329* (2013.01)

(58) Field of Classification Search
CPC ......... H04L 41/00; H04L 43/00; H04L 47/00; H04L 49/00; H04L 61/00; H04L 67/00
See application file for complete search history.

(56) References Cited

U.S. PATENT DOCUMENTS

| | | | | |
|---|---|---|---|---|
| 5,886,733 | A * | 3/1999 | Zdepski et al. | 725/64 |
| 6,081,278 | A * | 6/2000 | Chen | 345/473 |
| 6,181,686 | B1 * | 1/2001 | Hamalainen et al. | 370/347 |
| 6,219,089 | B1 * | 4/2001 | Driscoll et al. | 348/36 |
| 6,268,864 | B1 * | 7/2001 | Chen et al. | 345/428 |
| 6,337,708 | B1 * | 1/2002 | Furlan et al. | 348/36 |
| 6,366,969 | B1 * | 4/2002 | Hanson | 710/52 |
| 6,378,013 | B1 * | 4/2002 | Hanson | 710/100 |
| 6,507,611 | B1 * | 1/2003 | Imai et al. | 375/222 |
| 6,594,699 | B1 * | 7/2003 | Sahai et al. | 709/228 |
| 6,608,994 | B1 * | 8/2003 | Wegener et al. | 455/3.06 |
| 6,678,229 | B1 * | 1/2004 | James | 369/53.11 |
| 6,769,127 | B1 | 7/2004 | Bonomi et al. | |

(Continued)

OTHER PUBLICATIONS

Int'l Search Report—5 pgs., Apr. 18, 2013, Harris Corporation.

(Continued)

*Primary Examiner* — Ario Etienne
*Assistant Examiner* — Ho Shiu
(74) *Attorney, Agent, or Firm* — Tarolli, Sundheim, Covell & Tummino LLP (57) ABSTRACT

A system includes a delivery manager to process a request for media content that is stored in memory, the delivery manager being programmed to determine a media delivery mechanism for the media content based on constraints of at least one delivery parameter. The system includes a formatter programmed to adapt the media content to a media delivery format that is compatible with the media delivery mechanism and the constraints of the delivery parameter. The delivery manager can be programmed to adaptively initiate delivery of the media content in the media delivery format and via the delivery mechanism according to the constraints of the delivery parameter.

22 Claims, 8 Drawing Sheets

(56) References Cited

U.S. PATENT DOCUMENTS

| | | | |
|---|---|---|---|
| 6,885,624 B1* | 4/2005 | La et al. | 369/59.1 |
| 6,920,110 B2* | 7/2005 | Roberts et al. | 370/235 |
| 6,947,397 B2* | 9/2005 | Kim et al. | 370/329 |
| 6,996,132 B1* | 2/2006 | Tolety | 370/517 |
| 7,092,992 B1* | 8/2006 | Yu | 709/206 |
| 7,093,026 B2* | 8/2006 | Kokado et al. | 709/239 |
| 7,231,023 B1* | 6/2007 | Begeja et al. | 379/93.01 |
| 7,328,049 B2* | 2/2008 | Chanut | 455/574 |
| 7,379,980 B1* | 5/2008 | Gilbert | 709/220 |
| 7,423,972 B2* | 9/2008 | Shaham et al. | 370/236 |
| 7,437,428 B1* | 10/2008 | Muti et al. | 709/219 |
| 7,747,729 B2* | 6/2010 | Levy et al. | 709/224 |
| 7,849,158 B2* | 12/2010 | Fukui | 709/218 |
| 7,869,505 B2 | 1/2011 | Rodriguez et al. | |
| 7,895,615 B1 | 2/2011 | Godwin | |
| 7,957,470 B2 | 6/2011 | Rodriguez et al. | |
| 7,995,476 B2 | 8/2011 | Lou et al. | |
| 8,024,766 B2 | 9/2011 | Addington | |
| 2001/0010059 A1* | 7/2001 | Burman et al. | 709/224 |
| 2001/0039585 A1* | 11/2001 | Primak et al. | 709/228 |
| 2002/0080727 A1* | 6/2002 | Kim et al. | 370/252 |
| 2002/0083147 A1* | 6/2002 | Ripperger | 709/213 |
| 2002/0110149 A1* | 8/2002 | Roberts et al. | 370/477 |
| 2002/0112052 A1* | 8/2002 | Brittingham et al. | 709/224 |
| 2002/0138501 A1* | 9/2002 | Dake | 707/200 |
| 2002/0184038 A1* | 12/2002 | Costello et al. | 704/500 |
| 2003/0016760 A1* | 1/2003 | Kruys | 375/295 |
| 2003/0023745 A1* | 1/2003 | Noe | 709/235 |
| 2003/0028433 A1* | 2/2003 | Merriman et al. | 705/14 |
| 2003/0041165 A1* | 2/2003 | Spencer et al. | 709/233 |
| 2003/0069957 A1* | 4/2003 | Malmskog et al. | 709/223 |
| 2003/0103243 A1* | 6/2003 | Watanabe et al. | 358/405 |
| 2003/0217362 A1* | 11/2003 | Summers et al. | 725/63 |
| 2003/0233445 A1* | 12/2003 | Levy et al. | 709/224 |
| 2004/0002367 A1* | 1/2004 | Chanut | 455/574 |
| 2004/0068570 A1* | 4/2004 | Haller | 709/228 |
| 2004/0133907 A1 | 7/2004 | Rodriguez | |
| 2004/0143652 A1* | 7/2004 | Grannan et al. | 709/223 |
| 2004/0153890 A1* | 8/2004 | Davis et al. | 714/699 |
| 2004/0193942 A1* | 9/2004 | Barr et al. | 714/4 |
| 2004/0199637 A1* | 10/2004 | Li et al. | 709/227 |
| 2005/0025180 A1* | 2/2005 | Curcio et al. | 370/468 |
| 2006/0062250 A1* | 3/2006 | Payne, III | 370/468 |
| 2006/0274655 A1* | 12/2006 | Richter et al. | 370/230 |
| 2007/0053293 A1 | 3/2007 | McDonald | |
| 2007/0223495 A1* | 9/2007 | Fukui | 370/395.64 |
| 2007/0255850 A1* | 11/2007 | Gould et al. | 709/240 |
| 2008/0059647 A1* | 3/2008 | Jabri et al. | 709/231 |
| 2009/0097815 A1* | 4/2009 | Lahr et al. | 386/52 |
| 2010/0094931 A1* | 4/2010 | Hosur et al. | 709/203 |
| 2010/0161716 A1 | 6/2010 | Kajos et al. | |
| 2010/0166054 A1* | 7/2010 | Wirick | 375/240.1 |
| 2010/0167816 A1* | 7/2010 | Perlman et al. | 463/30 |
| 2010/0192190 A1* | 7/2010 | Savoor et al. | 725/109 |
| 2011/0013646 A1* | 1/2011 | Said et al. | 370/465 |
| 2011/0153856 A1 | 6/2011 | Piepenbrink et al. | |
| 2011/0164686 A1* | 7/2011 | Lu et al. | 375/240.25 |
| 2011/0246661 A1* | 10/2011 | Manzari et al. | 709/231 |
| 2011/0302319 A1* | 12/2011 | Ha et al. | 709/231 |
| 2011/0307929 A1* | 12/2011 | Youssefmir et al. | 725/89 |
| 2012/0014374 A1* | 1/2012 | Yaniro et al. | 370/352 |
| 2012/0106389 A1* | 5/2012 | Baker et al. | 370/252 |
| 2012/0203925 A1* | 8/2012 | Curcio et al. | 709/235 |

OTHER PUBLICATIONS

Written Opinion of the Int'l Searching Authority—7 pgs., Apr. 18, 2013, Harris Corporation.

\* cited by examiner

ADAPTIVE MEDIA DELIVERY

TECHNICAL FIELD

This disclosure relates to a media service and a method for adaptive delivery of media content.

BACKGROUND

In broadcasting, content providers, such as radio and television channels, playout media content from the broadcaster into broadcast networks that deliver the content to an audience. The networks can consist of terrestrial transmitters for analog or digital radio and TV, cable networks, IPTV as well as satellites. As one example, a broadcast automation system can ingest material from a satellite or line feed source and then time-shift that material based on a playlist or schedule. The resulting playlist is "loaded" into the appropriate channel of the broadcast automation system in advance of the transmission time. Various processes can cooperate to ensure the content is available on the correct servers for playout at the scheduled time. This can involve making advanced requests to move material from deep storage, such as tape archives or FTP clusters, to broadcast video servers.

SUMMARY

A media service and method for adaptive delivery of media content are disclosed. In one example, a system includes a delivery manager to process a request for media content that is stored in memory, the delivery manager being programmed to determine a media delivery mechanism for the media content based on constraints of at least one delivery parameter. The system includes a formatter programmed to adapt the media content to a media delivery format that is compatible with the media delivery mechanism and the constraints of the delivery parameter. The delivery manager can be programmed to adaptively initiate delivery of the media content in the media delivery format and via the delivery mechanism according to the constraints of the delivery parameter.

In another example, a method includes receiving a request for media content. This can include a processor determining an urgency of the request. The method includes selecting a delivery mechanism from a plurality of available delivery mechanisms based on the urgency of the request. The method also includes adapting a media format of the media content based on the urgency of the request relative to a quality constraint. This includes initiating delivery of the media content via the delivery mechanism based on the urgency of the request.

In yet another example, a media delivery system includes a delivery manager programmed to receive a request for media content and adaptively initiate delivery of the media content based on time and quality constraints specified in the request. A formatter generates a media format for delivery of the media content based on the constraints specified in the request. A weighting engine can be programmed to apply weighting to the time and quality constraints and to determine a delivery mechanism to deliver the media content based on the weighted time and quality constraints. An analyzer can then determine bandwidth capabilities for the delivery mechanism, wherein the delivery manager can be programmed to adapt delivery of the media content based on inputs received from the weighting engine and the analyzer.

DETAILED DESCRIPTION

This disclosure relates to a media service and method for adaptive delivery of media assets, such as audio, video or audio-video. Adaptive delivery of media relates to dynamically managing timing and/or quality of media delivery based on a requestor's needs, such as can be specified in a request or be established in advance (e.g., by agreement or contract). As opposed to current approaches that attempt to deliver media at the highest bandwidth possible at all times, adaptive delivery analyzes when a request for media content needs to be fulfilled and determines a schedule for initiating delivery of the media content to fulfill the request. The adaptive delivery can include formatting the media into delivery formats and utilizing delivery mechanisms that align with specifications of the request.

In one example, the request may specify immediate delivery of media where the delivery format may be adjusted to a lower quality to satisfy the request (e.g., lower playback resolution to increase delivery bandwidth). This may also include selecting a higher speed delivery mechanism (e.g., satellite feed versus cable feed) to satisfy the urgency of the request. In another example, a request for media may not require delivery for an extended period (e.g., several hours). In this example, formatting can be optimized for higher quality delivery according to a quality constraint for the requestor since packet delivery can be deferred and/or be scheduled to occur over longer periods of time. Also, other lower cost delivery mechanisms can be employed to deliver the media content for less urgent requests. By adaptively and dynamically adjusting media delivery formats and delivery mechanisms according to a requestor's specifications, as disclosed herein, media content can be delivered more efficiently and cost effectively than many existing delivery systems.

Figure 1:
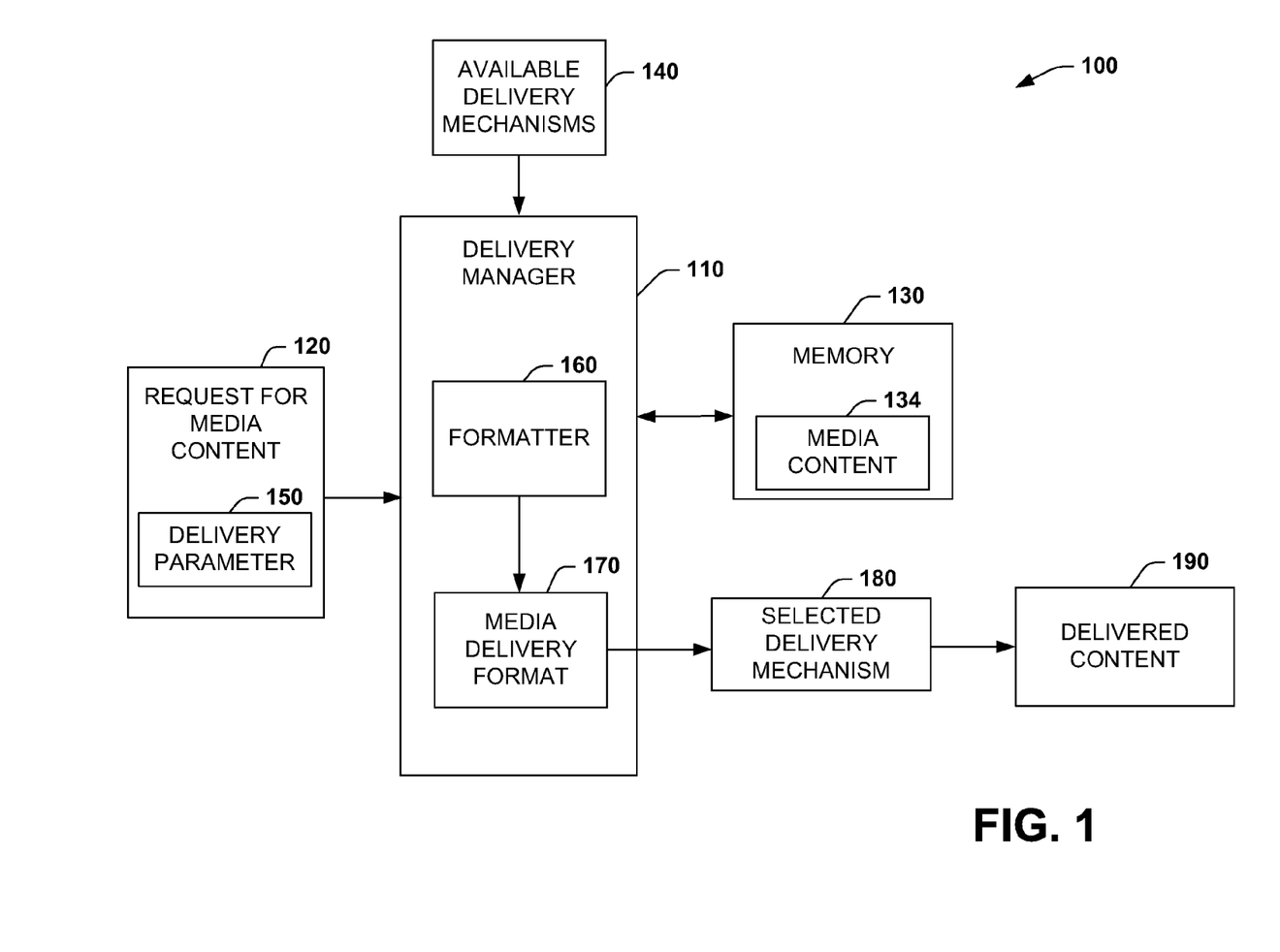
FIG. 1 illustrates an example of a system for adaptive media delivery.

FIG. 1 illustrates an example of a system 100 for adaptive media delivery and fulfillment. The system 100 includes a delivery manager 110 to process a request for media content 120. The content being requested can be stored in memory 130, such as a cloud storage medium or other form of data storage. The content requested is shown as media content 134 in the memory 130 and can includes a plurality of files or collections of data representing various forms of media. The delivery manager 110 can be implemented as executable instructions programmed to select a media delivery mechanism from a plurality of available delivery mechanisms 140 for the media content 134 based on analysis of constraints of at least one delivery parameter 150. The constraints can represent delivery variables such as time for delivery or quality of the delivered media content, for example, as will be described below. Such constraints can be provided in a request for media content. Alternatively or additionally, constraints could also be specified separate from a request, such as can be stored in memory as part of a user profile (not shown).

A formatter 160 can be programmed to adapt the media content stored at 130 to a media delivery format 170 that is compatible with a selected media delivery mechanism 180 from the available delivery mechanisms 140 and the constraints of the delivery parameter 150. The delivery manager 110 can be programmed to adaptively initiate delivery of the media content in the media delivery format 170 and via the selected delivery mechanism 180 and shown as delivered content at 190. The media content 134 stored at 130 can include digital media assets, such as television programs having audio and video components, radio programs having audio components, video files, audio files, and the like.

As used herein, the term fulfillment of a request for media can have differing interpretations depending on context. In some cases, fulfillment can refer to when the delivery manager initiates transmission of the content in the delivery format 170 via a data stream, such as in a real time context. In another context, fulfillment could take several hours or days as media is streamed intermittently, where fulfillment does not occur until the last packet of a delivery is received. Some requests for media content may be scheduled in advance, for example, meaning the requestor is willing to wait for some point in the future to receive the content. For scheduled requests, the delivery manager 110 can calculate the optimal delivery format 170 (e.g., highest resolution) and a most economical of available delivery mechanisms 140 to facilitate delivery of the media content 134. In a more urgent example, a user may request content for immediate playout. In that example, the delivery manager 110 may lower the media quality in order to fulfill the request in the required time period and available delivery mechanisms 140. The delivery manager 110 may also select a more expensive delivery mechanism from the possibilities of available delivery mechanisms 140 to attempt to fulfill the urgency of the request 120.

In some cases, a hybrid approach can be applied to fulfill a media request. For example, the hybrid approach can fulfill a portion of a media delivery by one selected delivery mechanism at 180 and a second portion of the media delivery could be fulfilled by a second delivery mechanism, which is different from that utilized for fulfillment of the first portion. In another example of a hybrid approach, different portions of a delivery for a media asset could be provided in different delivery formats to fulfill a given request. For instance, the formatter 160 could provide one format for the media delivery format 170 at the beginning of media delivery and a subsequent format could be applied at a later time in the delivery. Also, constraints such as time and media quality in the delivery parameter 150 can be specified according to variable scales that can be dynamically adjusted throughout the delivery of a given media asset (e.g., for the first half of the broadcast utilize real time streaming and high quality, and for the second half of the broadcast, utilize available bandwidth to complete the broadcast and at lower resolution if necessary).

The media delivery format 170 generated by the formatter 160 can be substantially any format that is appropriate for fulfilling the request for media content 120. This can include a plurality of differing formats that can be translated, transcoded, or transrated from the storage format of the memory 130 based on the request 120 and constraints of the delivery parameter 150. This can include on-the-fly formatting operations by the formatter 160, such as transcoding, resolution conversion (e.g., transrating), and transwrapping, as well as other media transformations based on the media request 120.

For example, transcoding is a process for converting the compressed essence type and can be considered the direct digital-to-digital data conversion of one encoding to another, such as for movie data files or audio files. Resolution conversion can involve changing an image size or aspect ratio in the media data content stored at 130, for example. Transwrapping involves changing the file container type for transporting the media data content such as using a secure socket layer in one example or utilizing unsecured wrapper in another example. The formatter 160 can also operate several processes including file-specific processes and essence-specific processes. File-specific processes include transwrapping to change file format (e.g., .MXF to .MOV) or essence wrapper (e.g., MPEG program, stream to MPEG elementary stream). Essence-specific processes include transrating to change bit-rates and transcoding to change compression standard. These processes can also include scaling to change image size, rate conversion to change frame rate (e.g., 30FPS to 25FPS), and so forth.

The memory 130 can be implemented as a large storage and delivery service, such as can be provided by a storage media farm of servers configured collectively as including a storage cloud and associated cloud delivery applications. Cloud storage can be considered a model of networked online storage where data can be stored on virtualized pools of storage which can be hosted by third parties. Hosting companies can operate large data centers where users or subscribers who require their data to be hosted buy or lease storage capacity and utilize it for their storage needs. Physically, resources can span across multiple servers. Such cloud storage services may be accessed through a web service API or through a web-based user interface, for example.

For purposes of simplification of explanation, in the present example, different components of the systems described herein are illustrated and described as performing different functions. However, one of ordinary skill in the art will understand and appreciate that the functions of the described components can be performed by different components, and the functionality of several components can be combined and executed on a single component or be further distributed across more components. The components can be implemented, for example, as computer executable instructions (e.g., software, firmware), hardware (e.g., CPU, an application specific integrated circuit), or as a combination of both. In other examples, the components could be distributed among remote devices across a network, for example.

Figure 2:
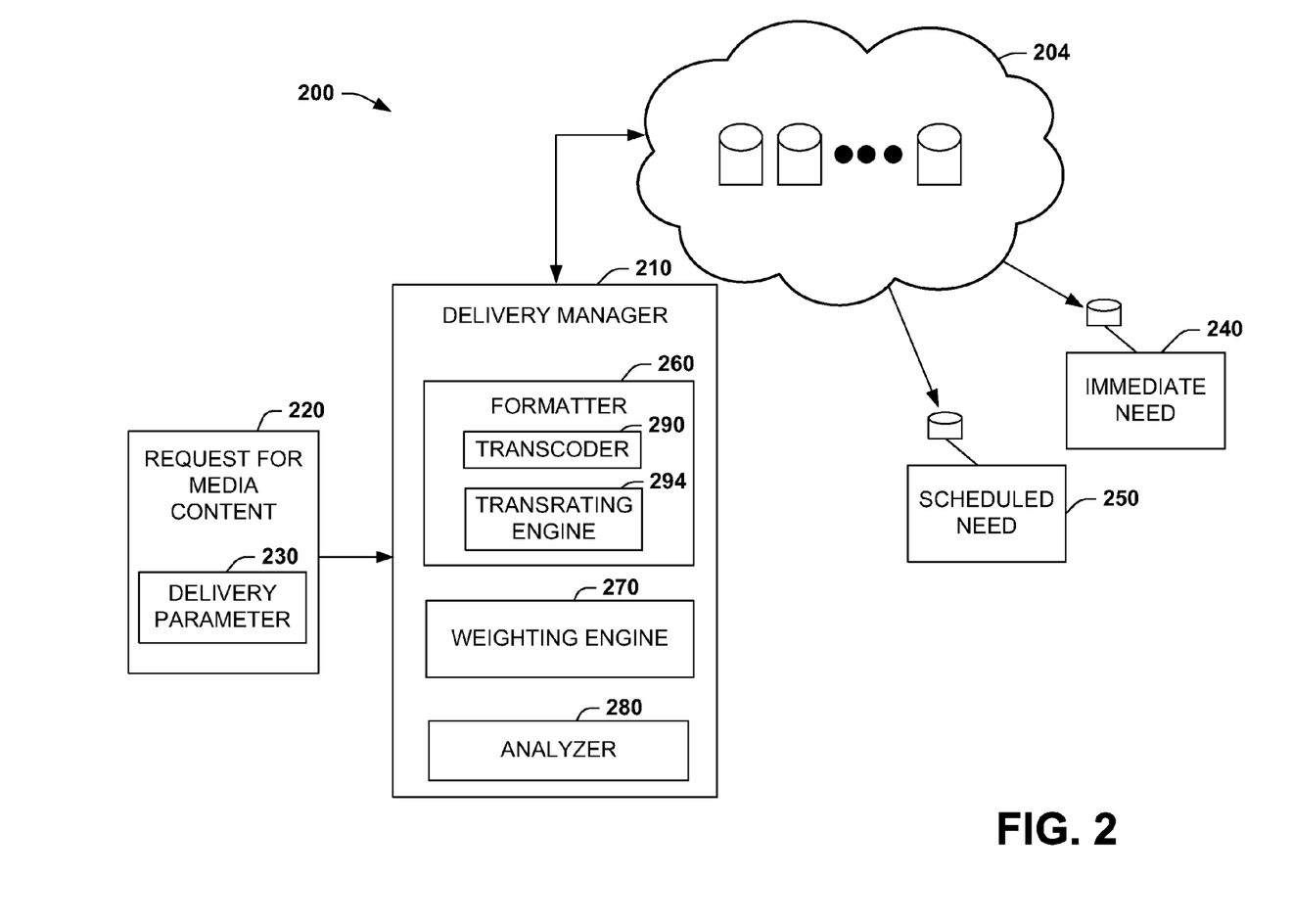
FIG. 2 illustrates an example of a system that adaptively initiates delivery of media according to differing requests.

FIG. 2 illustrates an example of a system 200 configured to adaptively initiate delivery of media according to differing requests. In this example, a cloud storage 204 (also referred to as cloud) can be configured to store a plurality of different media content (also referred to as media assets). The cloud storage 204 can include one or more databases for storing each of the media files in a storage format. Each media asset, for example, can correspond to an audio clip, a video clip, with or without audio, as well as text. A given media asset can also include metadata, which refers to data describing the attributes of content. For example, the metadata associated with a given media asset can describe its date of creation, type of media, file size, video resolution, audio sample rate, origin, owner, related concepts, keywords, content, documents, people and places, transcripts of any speech, copyright information, rights management (e.g., digital rights management) and any other data considered useful by the users of the media asset.

The system 200 includes a delivery manager 210 that is programmed to process a media request for content at 220 according to constraints supplied by one or more delivery parameters 230. The delivery manager 210 provides for adaptive media delivery by adjusting delivery formats and/or delivery mechanisms for media content in order to fulfill requirements of the request 120. The delivery manager 210 can also modify the metadata associated with the media content consistent with any changes to the media asset. In this example of FIG. 2, two differing types of request and delivery examples are shown although other scenarios are possible, such as disclosed with respect to FIGS. 4-8. Media delivery may be considered as file based or stream based, for example.

By way of example, delivery of a given media asset can be administered according to an immediate need, demonstrated schematically at 240, or according to a scheduled need, demonstrated schematically at 250. Adaptive media processing by the delivery manager 210 can be implemented to maximize channel efficiency of delivery mechanisms and available bandwidth that has been allocated for a requestor. For example, scheduled delivery can reduce peaks in media processing of resource demands since applications and resources required for media processing can defer operation on non-immediate requests. For the example of immediate media delivery, the delivery manager 210 can utilize a reserved delivery channel bandwidth for fulfillment and deliver the media (e.g., as a video file) with a quality that is set in a service agreement and or specified in the request for the media. For such a deferred delivery, the delivery manager 210 can be programmed to deliver the entire media file according to a file transfer protocol (FTP), for example. Alternatively, the delivery manager 210 can fulfill a request for a given media asset by adjusting parameters (e.g., by reducing quality) for the media asset to satisfy the immediacy of the request (e.g., via streaming) to facilitate playout upon receipt. This can be contrasted with a scheduled delivery in which the delivery manager 210 can utilize available (e.g., non-reserved) bandwidth and transfer the file for the requested media for subsequent playout. In service agreement, in which the delivery manager 210 can efficiently fulfill a scheduled need 250 as well as an immediate need 240 for media content, a scheduled delivery can be charged at a lower rate than immediate delivery, resulting in a cost saving incentive for the user.

With respect to immediate delivery at 240, media can be transcoded/transrated on-the-fly up to the highest quality/bit rate that can be supported by the allocated channel bandwidth. For instance, this can be based on the quality and/or bit rate specified in the request for the media. The media can be delivered as a stream or file in real time. With respect to scheduled delivery at 250, media can be transcoded/transrated off-line prior to or during the delivery process, for example. Off-line or non-real time processing is generally less resource intensive and typically enables transmission of a media asset in higher video quality (e.g., at a requested quality level). Media can be delivered as a file in non-real time and potentially delivered slower or faster in view of available channel bandwidth capacity.

As shown, the delivery manager can include a formatter 260, a weighting engine 270, and an analyzer 280. In one example, the formatter 260 configures the media delivery format depending on a type of the media content (e.g., audio, video, real time, and so forth). The weighting engine 270 can weight each of the delivery time constraint and the quality constraint for the media content depending on the type of the media content. The weighting engine 270 can prioritize the delivery time constraint over the quality constraint for the media content based on the type of media. If the weighting engine assigns an increased priority to the delivery time constraint, the formatter 260 can decreases the quality constraint (e.g., resolution) for the media content below a requested quality level to deliver a timely version of the media content in a timely manner via the delivery mechanism described above. In some examples, a minimum quality threshold can be set (e.g., by a requestor) to set an absolute minimum quality level that can be used to fulfill a request.

As another example, the weighting engine 270 can prioritize the quality constraint over the delivery time constraint for the media content based on the type of media and constraints in a given request. In this example, the quality constraint can be maintained to a maximum quality level such as to provide the media content with a quality level that matches the requested quality.

As a further example, there may be multiple requests for a given media asset. For instance, the request 220 can be a first request for the given media asset to meet an immediate need at 240 and deliver the media content with a reduced quality level as described above. The delivery manager 210 can also receive a second request for the media content from the same requestor. The second request 220 can be received with the first request or it may be received after the first request. In response to the delivery manager 210 processing the second request for the media content, the formatter 260 can be programmed to increase the quality constraint above the quality threshold that was established for fulfillment of the first request to provide for subsequent delivery of a higher quality version of the media content via the delivery mechanism.

The analyzer 280 can determine bandwidth capabilities for the media delivery mechanism. The formatter 260 can dynamically adapt the format of the media content to ascertain a least cost delivery mechanism that also satisfies the quality constraints of the delivery parameter 230. The delivery parameter 230 can specify an immediate need, at 240, where the formatter 260 can be programmed to adapt the media delivery format as the best available quality supported by an allocated delivery channel bandwidth that satisfies the immediacy of the need. In another example, the delivery parameter specifies a scheduled need, wherein the formatter 260 can be programmed to adapt the media delivery format for delayed time delivery according to available channel bandwidth capacity and one or more other media assets that are scheduled for delivery via the selected delivery mechanism.

As disclosed herein, the formatter 260 can include a transcoder 290 to transcode the media to the media delivery format. The formatter 260 can also include a transrating engine 294 to transrate the media to the media delivery format. While in the example of FIG. 2, the transcoder 290 and transrating engine 294 are demonstrated as being implemented within the delivery manager 210, such functions and methods could be implemented in the cloud 204 (e.g., accessed by corresponding APIs employed by the formatter 260). In this way, a distributed and diverse set of transcoding and transrating functions can be available to accommodate various delivery parameters 230 that can be provided in each request or service agreement.

The delivery manager 210 can be programmed to initiate delivery of media content for use during a live broadcast of the media content via the delivery mechanism at lower viewing quality to meet time constraints imposed by the delivery parameter 230. In another example, the delivery manager 210 can be programmed to initiate delivery a second version of same media content with a higher viewing quality format at a later time, such as can be ingested by a playout system for subsequent transmission to an audience. For example, in a breaking news story in the early afternoon, it may be necessary to request immediate delivery of a media asset for use during a live broadcast. For showing of the event on a subsequent (e.g., in the evening) broadcast however, another request for the same media can be issued with a scheduled need at 250, which can result in the delivery manager adapting the subsequent delivery of a higher quality version in time for the evening broadcast.

Figure 3:
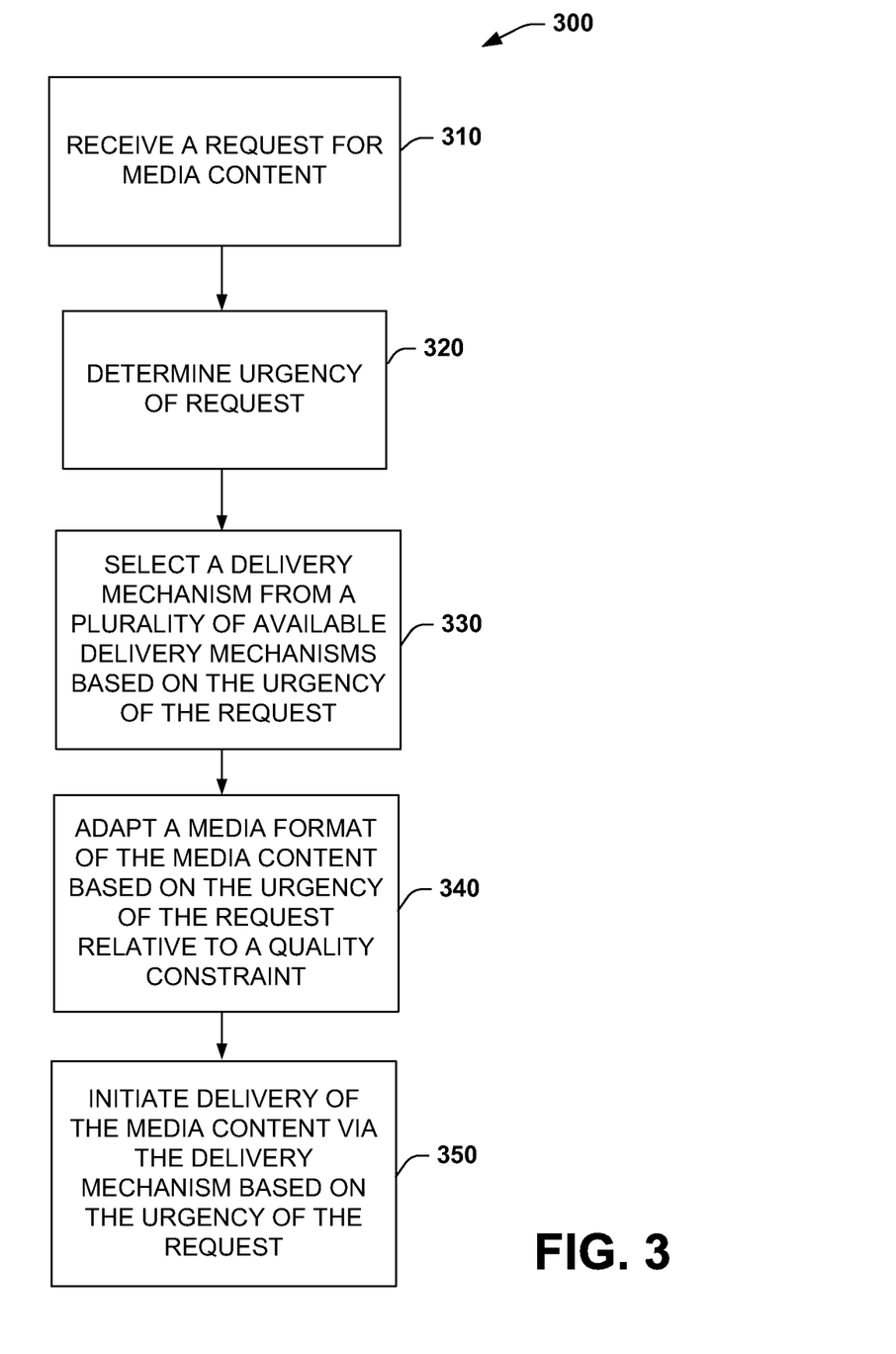
FIG. 3 illustrates an example method for adaptive media delivery.

In view of the foregoing structural and functional features described above, an example method 300 will be better appreciated with reference to FIG. 3. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be stored in memory as machine readable instructions. The machine readable instructions corresponding to the method 300 can also be executed by a processor in a computer, such as a server, for example. Before proceeding, it is noted that FIG. 3 provides a generalized method that describes the basic components of adaptive media delivery and playout. FIGS. 4-8 then follow as specific examples of such delivery and playout with example time frames illustrated for delivery and playout of media content in FIGS. 5-8

The method 300 includes receiving a request for media content at 310 (e.g., via delivery manager 110 of FIG. 1). The method 300 includes determining an urgency of the request at 320 (e.g., analyzing constraints of delivery parameter 150 of FIG. 1 via delivery manager 110). The urgency of the request can be determined by analyzing constraints imposed by a delivery parameter in the request. The constraints can be specified according to a time parameter and/or a quality parameter, for example, that can be provided in the request or stored in memory as part of requestor's profile. For instance, the constraints can be expressed as an immediate need or as a scheduled need.

At 330, the method 300 includes selecting a delivery mechanism from a plurality of available delivery mechanisms based on the urgency of the request (e.g., via delivery manager 110 of FIG. 1). At 340, the method 300 includes adapting a media format of the media content based on the urgency of the request relative to a quality constraint (e.g., via formatter 160 of FIG. 1). At 350, the method 300 includes initiating delivery of the media content via the delivery mechanism based on the urgency of the request (e.g., via selected delivery mechanism 180 of FIG. 1). Although not shown, the method 300 can also include determining the urgency of the request by analyzing constraints imposed by a delivery parameter in the request. The constraints can be specified according to a time parameter or a quality parameter, for example. The constraints can be specified as an immediate need or as a scheduled need in another example. The method 300 can also include adjusting delivered media quality to satisfy the time parameter. This can include employing multiple delivery mechanisms or multiple delivery formats to fulfill the request.

Figure 4:
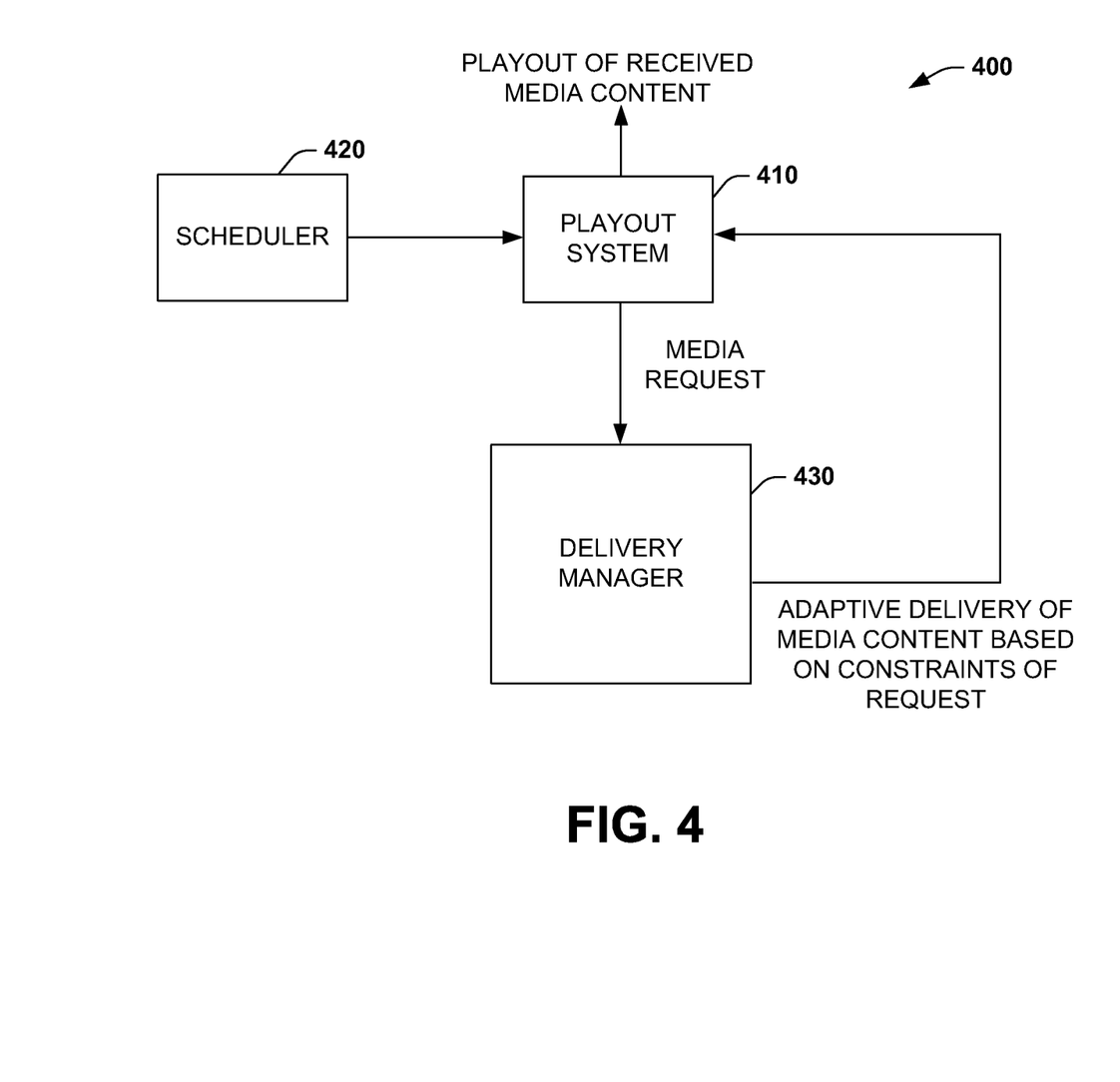
FIG. 4 illustrates an example of a broadcast system for requesting and playout of adaptive media content from a delivery manager.

FIG. 4 illustrates an example of a broadcast system 400 for requesting and playout of adaptive media content from a delivery manager (e.g., the delivery manager disclosed in relation to FIG. 1 or 2). The system 400 includes a playout system 410 for transmitting media content to an audience, which can include the public or other entities. The playout system 410 can be controlled by a broadcast studio, Internet broadcaster, cable provider and so forth having associated computing devices and computer storage for ingesting and playing out media content. A scheduler 420 can provide a time indication of when media is scheduled for a given broadcast event, such as can be provided as a playlist or other scheduling data. Based on input from the scheduler 420, a media request can be generated and sent to a delivery manager 430. Alternatively or additionally, the scheduler can provide the schedule, corresponding to the media request, directly to the delivery manager 430.

Based on the parameters specified in the schedule data event from the scheduler 420, the media request may be sent as an immediate request for content or as some form of scheduled request that can request the media content by some specified time in the future. Based on the media request, and the urgency of the request as defined by constraints supplied with the request, the delivery manager 430 adaptively initiates delivery of requested media content to the playout system 410. Upon ingest of all or portions of the media content, the playout system 410 can store the delivered media asset in memory. The playout system 410 can play the delivered media content upon receipt (e.g., by buffering the media data in an output queue) or play it out at some designated time in the future according to the scheduling information for the media asset.

FIGS. 5-8 provide some example timing scenarios for adaptive media delivery and fulfillment, such as demonstrating the timing of processing a media request by the delivery manager 430 and when playout is commenced by the playout system 410 of FIG. 4. In some examples, a broadcaster can ingest a complete media asset from a delivery system before playback begins. In other examples, playout can begin upon initial receipt of the media asset or receipt can overlap with ingest and playout.

Before describing the example scenarios of FIGS. 5-8, some examples of parameters are as follows:
Specified Parameters:
Ts=deliver start time–request parameter
Td=delivery by time–request parameter
Qmin=minimum media quality (bitrate)–such as specified by service agreement/request parameter
Qmax=maximum media quality (bitrate)–such as specified by service agreement and/or request parameter
Intrinsic Parameters:
Qmedia=native media quality (e.g., has stored in cloud storage)
tplayback=native media duration
DelChanBw=delivery channel bandwidth–such as provided by connection/service agreement
Calculated/Measured Parameters:
Qdel=delivered media quality (bitrate)/calculated by delivery system
Qmin<=Qdel<=Qmax AND Qdel<=Qmedia
tdeliver=media delivery time (media delivery rate)/calculated by delivery system As demonstrated in FIG. 5, the timing diagram 500 relates to an immediate request for immediate fulfillment of a media asset for delivery and playout. The upper portion of the timing diagram 500 demonstrates an example delivery system timeline and the lower portion of the timing diagram 500 demonstrates an example playout system timeline.

Figure 5:
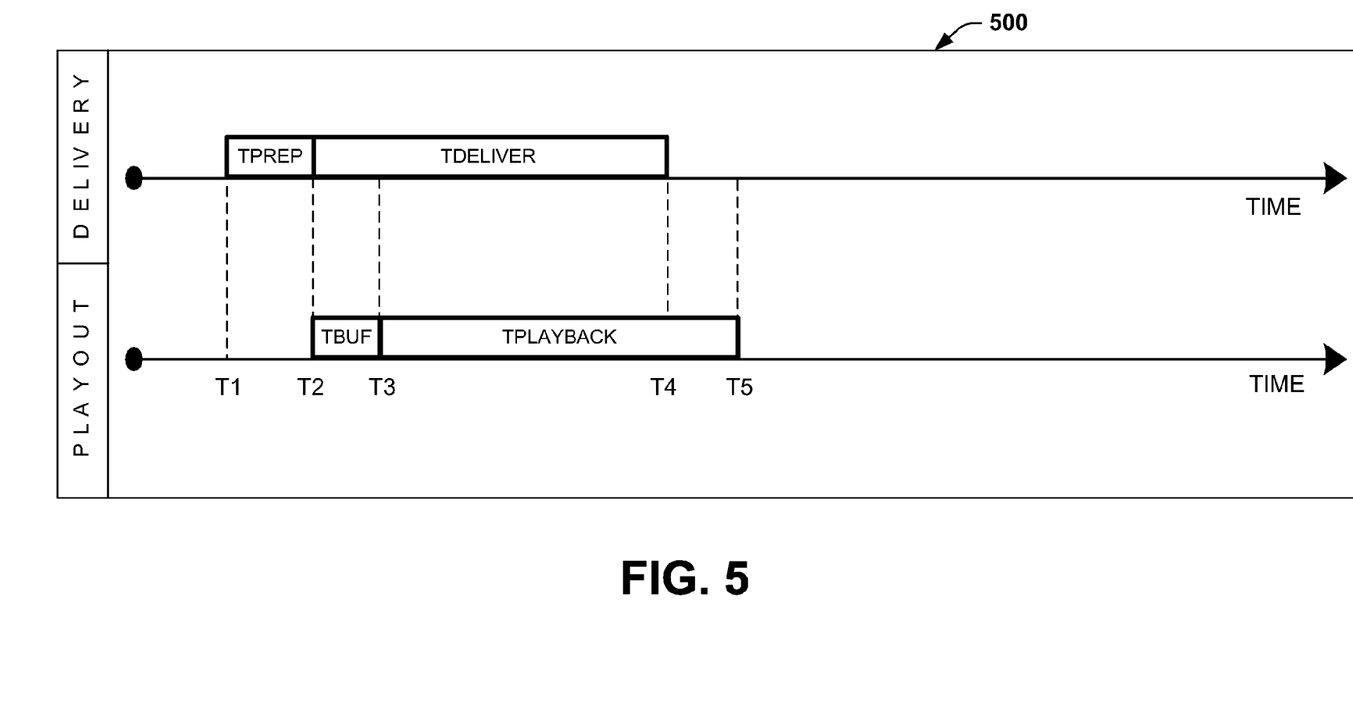
FIGS. 5-8 illustrate example timing diagrams for delivery and playout systems utilizing adaptive media delivery.

For immediate/real time needs, media can be transcoded/transrated on the-fly to the best quality (bitrate<Qmax) that can be supported by the allocated delivery channel bandwidth (DelChanbw). Media is generally not transrated above its native bit rate (Qmedia). Media can be delivered as a stream or file in real time. Playback can begin as soon as enough media is delivered for buffering purposes. In this example, the relevant parameters can be described as follows:
Ts=0—in this case the content media needed immediately
Td=tplayback—media needed in real-time
NOTE: tprep is small due to on-the-fly/in-line processing
SET Qdel=min {DelChanbw, Qmax, and Qmedia}—For instance, the delivery quality can be set to a bit rate corresponding to the lowest bit rate specified by the delivery channel bandwidth, the maximum quality (e.g., specified by service agreement or request parameter) and the native bit rate.

The circumstances demonstrated in the example of FIG. 5 can correspond to where a requestor has requested immediate, real-time streaming of media. Thus, the delivered media quality (Qdel), which can be represented as a bitrate, cannot exceed the bitrate of the delivery channel. There are also secondary requirements (stated in the general conditions above) that media should not be transcoded or transrated above its native bitrate (Qmedia) or above the maximum bitrate (Qmax) specified by the service agreement.

With respect to the timing diagram 500, at time T1, Delivery System immediate request received–media delivery processing (duration=tprep) begins to prepare the media asset for delivery. For the Playout System at T1, media instantiated (name allocated)/storage space allocated in memory. At time T2 for Delivery System, source media delivery begins (duration=tdeliver). For Playout System at T2, receive/buffering for the delivery of the media content begins (duration=tbuff). At time T3 for Playout System, ON-AIR playback begins (duration=tplayback). At time T4 for Delivery System, delivery concludes. The playback continues at the Playout System until time T5 when playback concludes. In this example, a media asset is being delivered (e.g., streamed) in real time, therefore tdeliver=tplayback. In other examples, tdeliver< >tplayback.

Figure 6:
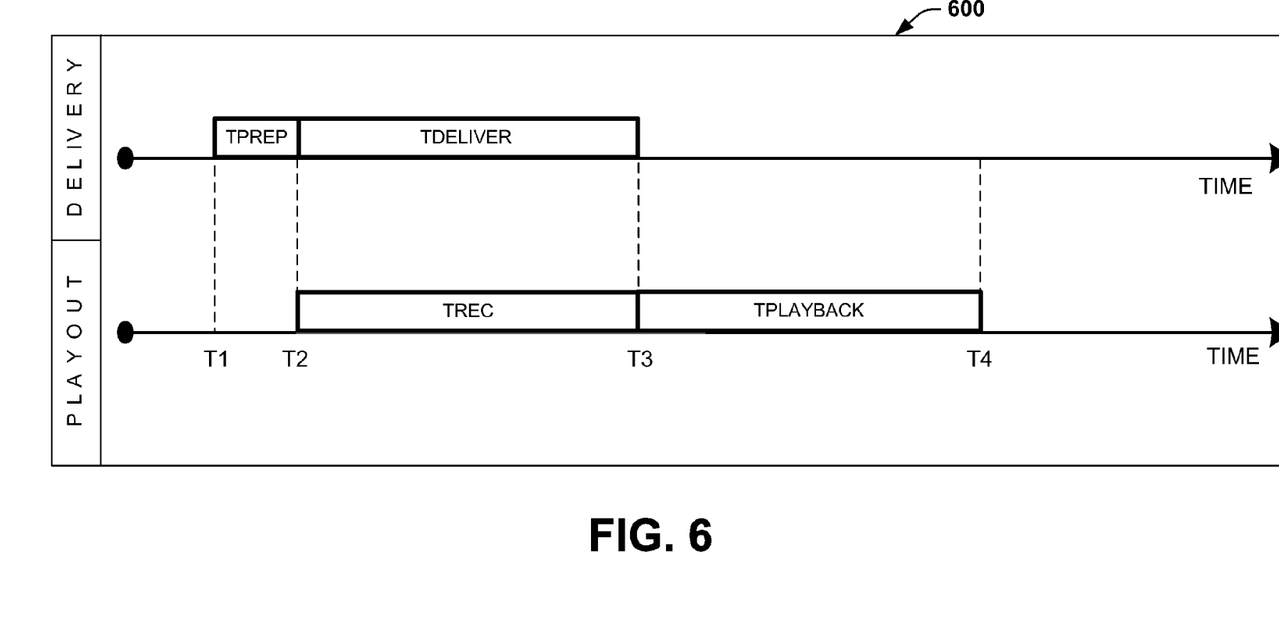

FIG. 6 is another timing diagram 600 for delivery and playout systems. In this example, an immediate request/faster than real time need is diagramed, where media is transcoded/transrated on-the-fly to the highest possible quality (bitrate>Qmin) that can be supported by the allocated delivery channel bandwidth and temporal constraints of the delivery time. Playback can begin at T3 as soon as a complete file is delivered. For the timing example 600, the following parameters apply:

Td<tplayback–media needed faster than real-time
tdelivery=Td–Ts–>since Ts=0, tdelivery=Td
NOTE: tprep tends to be small due to on-the-fly/in-line processing
SET Qdel where: Qmin<=Qdel<=(tdelivery/tplayback)× (min value of) [DelChanbw, Qmax, Qmedia])

This example of FIG. 6 corresponds to a scenario where a requestor has requested delivery that is faster than actual real-time delivery of media. As a result, the Qdel is set to a compression ratio specified by parameters (tdelivery/tplayback), multiplied by the Delivery channel bandwidth (DelChanbw). By definition the compression ratio is less than 1; however, the DelChanbw may in certain circumstances be greater than either Qmax or Qmedia. Consequently, the lowest value (e.g., bit rate value) of such constraints is selected.

With respect to the timing diagram 600, at T1 for the Delivery System, an as-soon-as-possible request is received, where media delivery processing (duration=tprep) begins. For the Playout System at T1, media can be instantiated (name allocated)/storage space allocated. At time T2 for the Delivery System, source media delivery begins (duration=tdeliver). At time T2 for the Playout System, receive/buffering begins (duration=trec). At time T3 for the Delivery System, delivery concludes. At time T4 for the Playout System, ON-AIR Playback can begins (duration=tplayback). At time T5 for the Playout System, playback concludes.

Figure 7:
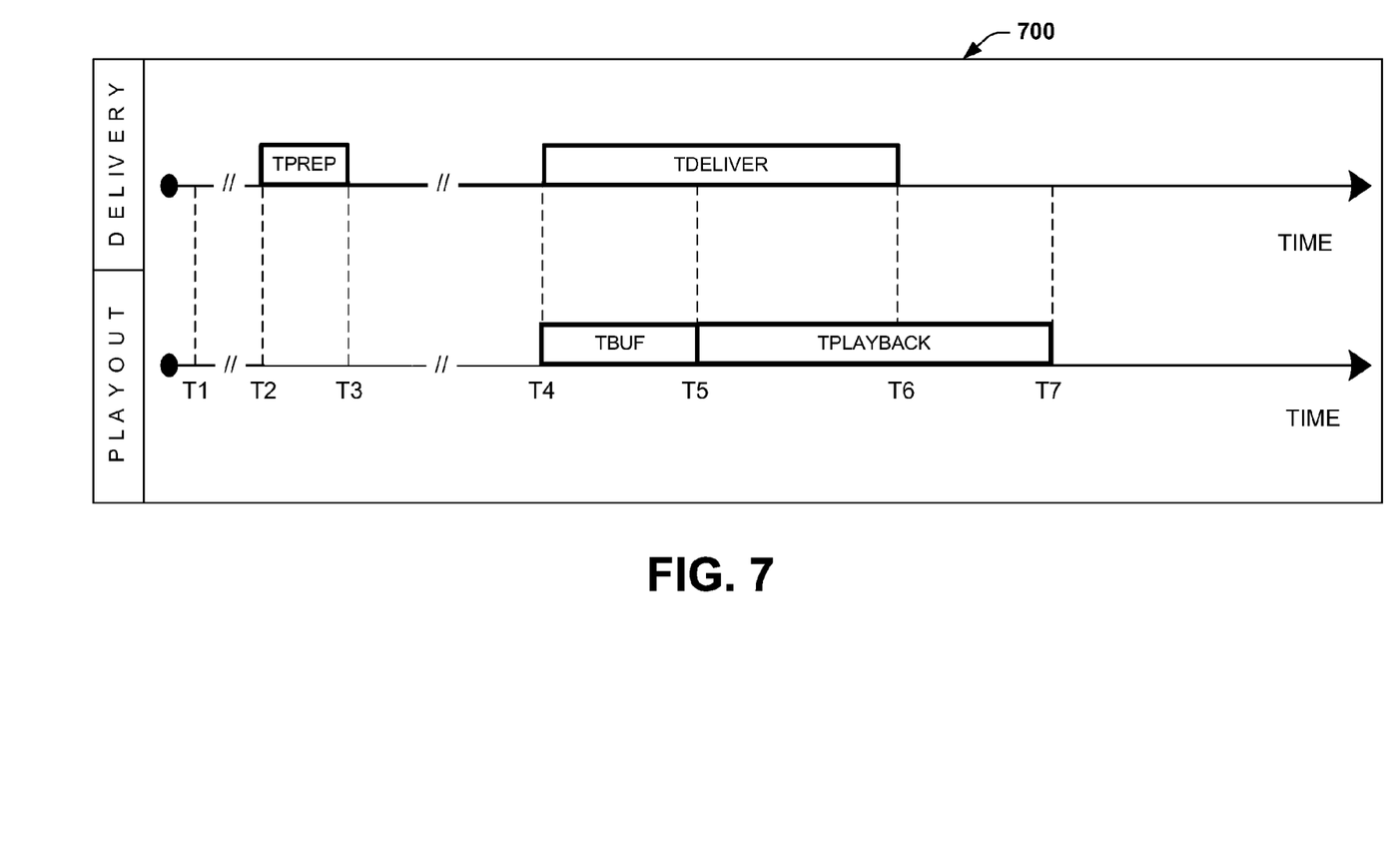

FIG. 7 is another example of a timing diagram 700 for delivery and playout systems. In this example, a scheduled delivery real time request is generated, where media can be transcoded/transrated off-line (prior to or during the delivery process) to the best possible quality (e.g., bitrate<Qmax) that can be supported by the allocated delivery channel bandwidth (DelChanbw). Media is generally not transrated above its native bit rate (Qmedia). A scheduled (or deferred) start allows for more efficient off-line or non-real-time processing that is less resource intensive and usually results in higher image quality at a given bitrate. The media content can be delivered to the Playout System as a stream or file in real time. Playback can begin as soon as enough media is delivered for buffering purposes. For this example, the following parameters apply:

Ts>0–media needed later (e.g., a deferred start time for media playout)
Td=Ts+tplayback–media needed in real-time
NOTE: tprep can be large due to off-line processing
SET Qdel=min {DelChanbw, Qmax, and Qmedia}

In this example, a requestor has requested media but having a time constraint indicating a deferred start time. The requisite time by which delivery must occur is set to the start time plus the playback time. In order to meet this deferred delivery however, the delivered media quality (Qdel) cannot exceed the bitrate of the delivery channel and is further constrained by the native bitrate (Qmedia) and the maximum bitrate (Qmax), such as can be specified by the service agreement.

With respect to the timing diagram 700, at T1 for the Delivery System, a scheduled request is received. At T1 for the Playout System, media is instantiated (name allocated)/storage space allocated. At T2 for the Delivery System, media delivery processing (duration=tprep) begins when processing capacity is most economical in the time period, for example between T1 and T4. At T3 for the Delivery System, media preparation completes. At T4 for the Delivery System, media delivery begins (tdeliver=tplayback). At T4 for the Playout System, receive/buffering begins. At T5 for the Playout System, ON-AIR Playback begins (duration=tplayback) such as according to a schedule. At time T6 for the Delivery System, delivery concludes. At time T7 for the Playout System, playback concludes.

Figure 8:
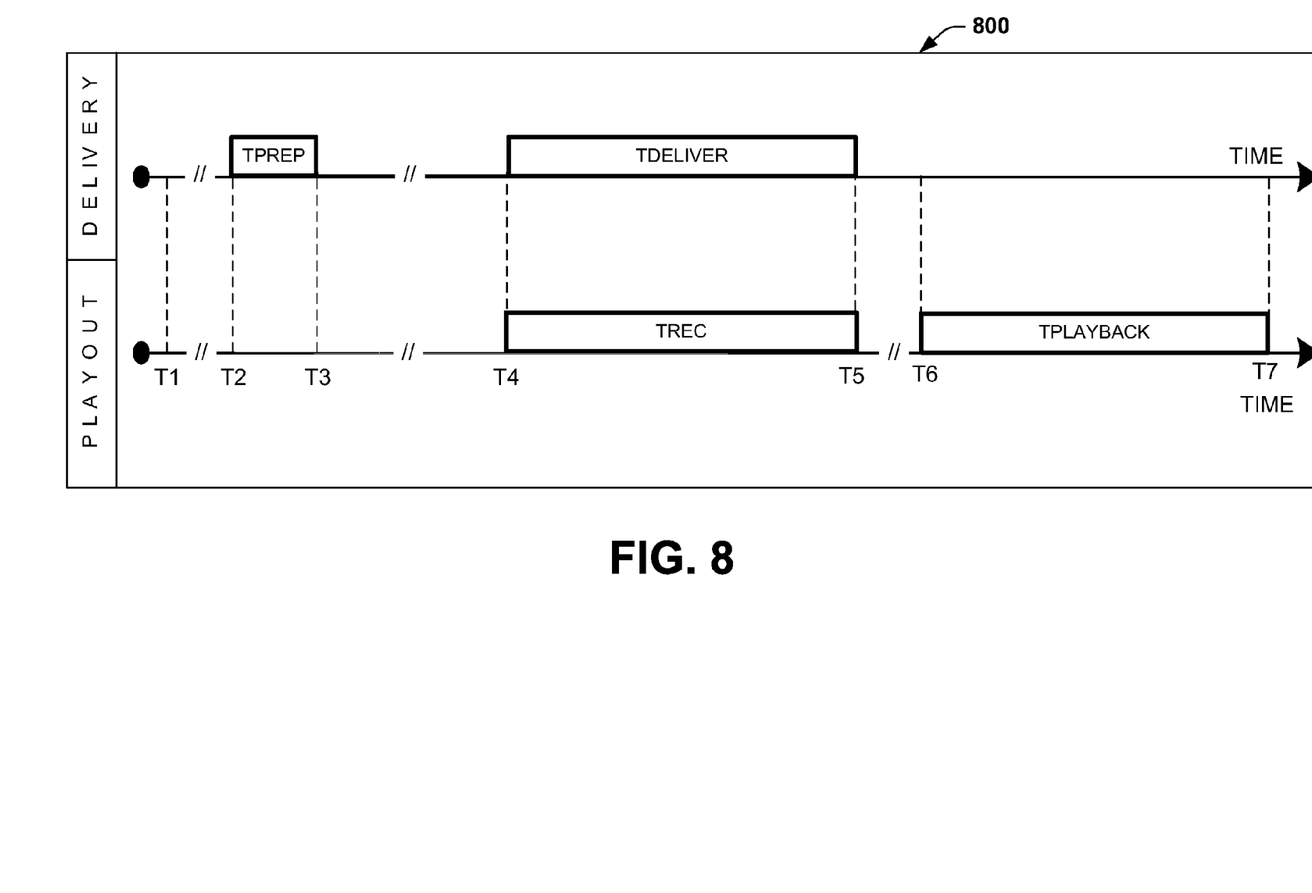

FIG. 8 is another example of a timing diagram 800 for delivery and playout systems. In this example, a scheduled, slower than immediate need is described. Thus, in this example media content can be transcoded/transrated off-line (prior to or during the delivery process) to the best possible quality (bitrate)<(Qmax) that can be supported by the allocated delivery channel bandwidth (DelChanbw). Media is generally not transrated above its native bit rate (Qmedia). A scheduled (e.g., deferred) start allows for more efficient off-line or non-real time processing that is less resource intensive and can result in higher image quality at a given bitrate. Media can be delivered as a stream or file in non-real time (e.g., possibly slower or faster depending on available channel bandwidth capacity/cost). For this example, the following parameters apply:

Ts>0–media needed later
Td>Ts+tplayback–media needed slower than real-time
NOTE: tprep can be large due off-line processing
SET Qdel=(to the lower value of) DelChanbw, Qmax, and Qmedia The example of FIG. 8 is similar to the scenario of FIG. (where media is needed later). However, in this example, there are fewer delivery time constraints, meaning that as much time as needed can be taken to deliver the media, as long as it is completed by Td. Consequently, compression is only required if Qmedia>Qmax or if Qdel would exceed the DelChanbw times the greater-than-one ratio (tdelivery/tplayback).

With respect to the timing diagram 800, at T1 for the Delivery System, a scheduled request is received. At T1 for the Playout System, media is instantiated (name allocated)/storage space allocated. At T2 for the Delivery System, media delivery processing (duration=tprep) begins when processing capacity is most economical in the time period between T1 and T4. At time T3 for the Delivery System, media preparation completes. At time T4 for the Delivery System, source media delivery begins (duration=tdeliver) when bandwidth is most economical in the time period between T3 and T5. At time T4 for the Playout System, receive/buffering begins (duration=trec). At time T5 for the Delivery System, delivery concludes. At time T5 for the Playout System, receive buffering concludes. At time T6 for the Playout System, ON-AIR Playback begins (duration=tplayback). At time T7 for the Playout System, Playback concludes.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising at least one processor configured to execute instructions stored in a non-transitory computer readable medium, the instructions comprising:
    a delivery manager configured to process a request for media content that is stored in memory, the delivery manager further to select a media delivery medium from a plurality of different media delivery mediums for the media content based on at least a delivery time constraint and a quality constraint;
    a formatter configured to adapt the media content to a media delivery format that is compatible with the selected media delivery medium and constraints of at least one delivery parameter;
    wherein the delivery manager is configured to deliver the media content in the media delivery format based on the constraints of the at least one delivery parameter and the selected delivery medium; and
    a weighing engine further configured to weight each of the delivery time constraint, the quality constraint for the media content and a type of content included in the media content to generate a weighted delivery time constraint and a weighted quality constraint for the media content, the delivery manager employing the weighted delivery time constraint and the weighted quality constraint to control the media delivery format and delivery timing of the media content;
    wherein the weighing engine is configured to prioritize the delivery time constraint over the quality constraint for the media content or the quality constraint over the delivery time constraint based on the type of media content to deliver a timely version of the media content timely via the selected delivery medium;
wherein each of the plurality of different media delivery mediums corresponds to a respective transmission medium for delivery of the media content.

2. The system of claim 1, wherein the formatter is further configured to configure the media delivery format depending on a type of the media content.

3. The system of claim 1, wherein the formatter is further configured to decrease the quality constraint for the media below a quality threshold to deliver the timely version of the media content timely via the selected delivery medium in response to the weighing engine prioritizing the delivery time constraint over the quality constraint for the media content.

4. The system of claim 3, wherein the request is a first request, wherein, in response to the delivery manager processing a second request for the media content, the formatter is further configured to increase the quality constraint above the quality threshold for subsequent delivery of a quality version of the media content via the selected delivery medium.

5. The system of claim 1, further comprising an analyzer configured to determine bandwidth capabilities for the selected media delivery medium, the formatter further configured to dynamically adapting the media content to match the selected media delivery medium, wherein the selected media delivery medium is a least cost delivery medium of the plurality of delivery mediums that also satisfies the constraints of the at least one delivery parameter.

6. The system of claim 5, wherein the at least one delivery parameter specifies an immediate need, the formatter further configured to adapt the media delivery format as the best available quality supported by an allocated delivery channel bandwidth of the selected delivery medium.

7. The system of claim 5, wherein the at least one delivery parameter specifies a scheduled need, the formatter further configured to adapt the media delivery format for delayed time delivery according to available channel bandwidth capacity and other media content that is scheduled for delivery via the selected delivery medium.

8. The system of claim 1, wherein the formatter includes a transcoder configured to transcode the media to the media delivery format.

9. The system of claim 1, wherein the formatter includes a transrating engine configured to transrate the media to the media delivery format.

10. The system of claim 1, wherein the delivery manager is further configured to deliver the media content via the selected delivery medium for a live broadcast at a reduced viewing quality relative to a quality constraint for the media content to satisfy time constraints imposed by the at least one delivery parameter.

11. The system of claim 10, wherein the delivery manager is further configured to deliver a second version of the media content via the selected delivery medium for playout after the live broadcast thereof with a higher viewing quality format relative to the media content delivered for the live broadcast based on a quality constraint.

12. The system of claim 1, wherein each respective transmission medium is a satellite or a line feed source.

13. The system of claim 1, wherein the delivery manager is configured to:
    initiate delivery of a given portion of the media content across a given media delivery medium of the plurality of different medial delivery mediums in a selected media delivery format according to the constraints of the at least one delivery parameter;
    change the selected media delivery medium from the given media delivery medium to another media deliver medium of the plurality of different medial delivery mediums; and initiate delivery of a remaining portion of the media content across the other media delivery medium in another media delivery format according to the constraints of at least one delivery parameter.

14. The system of claim 1, wherein the type of content included in the media content comprises a television program.

15. The system of claim 14, wherein the television program comprises a real-time news program.

16. A method, comprising:
receiving a request for media content;
determining, by a processor, an urgency of the request;
selecting a delivery medium from a plurality of different available delivery mediums based on at least a delivery time constraint and a quality constraint;
weighing each of the delivery time constraint, the quality constraint for the media content and a type of media content included in the media content to generate a weighted delivery time constraint and a weighted quality constraint for the media content, wherein weighing comprises prioritizing the delivery time constraint over the quality constraint for the media content or the quality constraint over the delivery time constraint based on the type of media content to deliver a timely version of the media content via the selected delivery medium;
adapting a media format of the media content based the weighted delivery time constraint and the weighted quality constraint; and
delivering the media content based on the selected delivery medium and the urgency of the request;
wherein each of the plurality of different media delivery mediums corresponds to a respective transmission medium for delivery of the media content.

17. The method of claim 16, further comprising determining the urgency of the request by analyzing constraints imposed by a delivery parameter in the request.

18. The method of claim 17, wherein the constraints are specified according to a time parameter or a quality parameter.

19. The method of claim 18, wherein the constraints are expressed as an immediate need or as a scheduled need.

20. The method of claim 18, further comprising adjusting delivered media quality to satisfy the time parameter.

21. The method of claim 16, further comprising employing multiple delivery mechanisms or multiple delivery formats to fulfill the request.

22. A media delivery system comprising at least one processor configured to execute instruction stored in a non-transitory computer readable medium, the instructions comprising:
a delivery manager configured to receive a request for media content and adaptively-initiate delivery of the media content based on at least a time constraint, a quality constraint and a type of the media content in the media content specified in the request;
a weighting engine configured to apply weight to the time constraint and the quality constraint and the type of content included in the media content to generate a weighted time constraint and a weighted quality constraint for the media content and to select a delivery medium from a plurality of delivery mediums to deliver the media content based on the weighted time and quality constraint, wherein weighing comprises prioritizing the delivery time constraint over the quality constraint for the media content or the quality constraint over the delivery time constraint based on the type of media content to deliver a timely version of the media content via the selected delivery medium;
an analyzer configured to determine bandwidth capabilities for the selected delivery medium;
a delivery manager configured to deliver the media content based on the selected delivery medium and the inputs received from the weighting engine and the analyzer; and
a formatter configured to generate a media format for delivery of the media content that is compatible with the selected media delivery medium and constraints specified in the request;
wherein each of the plurality of different media delivery mediums corresponds to a respective transmission medium for delivery of the media content.

* * * * *